(No Model.)
J. GEDEOHN.
CULTIVATOR.
No. 460,240. Patented Sept. 29, 1891.
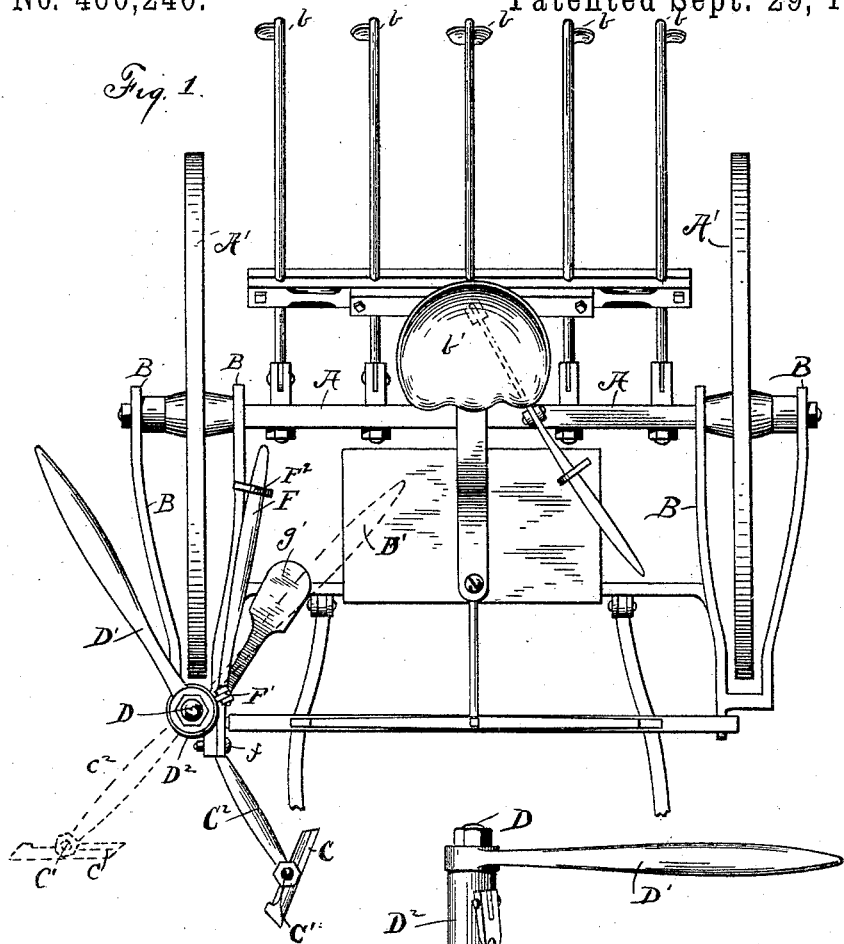
Fig. 1.
Fig. 2.
Fig. 3.
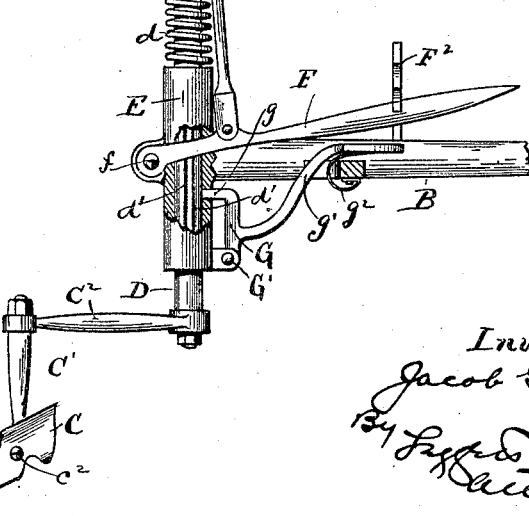
Witnesses:
E. Byron Gilchrist
Inventor,
Jacob Gedeohn
By Liggett & Liggett
Attorneys

UNITED STATES PATENT OFFICE.

JACOB GEDEOHN, OF AVON LAKE, OHIO.

CULTIVATOR.

SPECIFICATION forming part of Letters Patent No. 460,240, dated September 29, 1891.

Application filed April 6, 1891. Serial No. 387,769. (No model.)

*To all whom it may concern:*

Be it known that I, JACOB GEDEOHN, of Avon Lake, in the county of Lorain and State of Ohio, have invented certain new and useful Improvements in Cultivators; and I do hereby declare the following to be a full, clear, and exact description of the invention, such as will enable others skilled in the art to which it pertains to make and use the same.

My invention relates to an improved cultivator, the same having a swinging arm mounted on an upright spindle, the free end of the arm bearing a cultivator-blade and the spindle having a hand-lever for swinging the cultivator-blade laterally in and out between, for instance, grape-vines or hills of corn or trees growing in rows, whereby the ground between the vines, hills, or trees of a row may be cultivated at the same time that the ground is being cultivated between the rows.

In the accompanying drawings, Figure 1 is a plan. Fig. 2 is an enlarged elevation in detail, parts being in section. Fig. 3 is an end elevation in detail of the swinging cultivator-blade.

A represents the axle, A' the wheels, B the cultivator-frame mounted on the axle, $b\ b$ the trailing cultivator-blades, and $b'$ the seat for the operator, all of which may be of ordinary construction and to which I make no claim.

My invention pertains solely to the cultivator-blade C and the attachments for operating the same, which may be as follows: Blade C is mounted on a center post C', depending from the lateral arm $C^2$, this arm being an attachment of the upright spindle D. Spindle D is journaled in and extends up through the bore of sleeve E, the latter being an attachment of the cultivator-frame and being located, preferably, as shown, at the forward right-hand corner of the frame. Above the sleeve the spindle is provided with a loose collar $D^2$ and with a hand-lever D', by manipulating which lever-blade C may be swung laterally. (See solid and dotted lines, Fig. 1.) Inside the sleeve and coiled around spindle D is a spiral spring $d$, the latter below bearing on an internal ledge of the sleeve and above engaging collar $D^2$ aforesaid, the spring acting in the direction to elevate the spindle. In Fig. 2 collar $D^2$ is shown engaging the top end of the sleeve, and the distance between the lower end of the sleeve and arm $C^2$ indicates the amount of end-play of the spindle. A treadle F is pivoted at $f$ and connects with rod F', that in turn connects with collar $D^2$. By depressing this treadle the spindle is depressed against the action of spring $d$, and the recoil of this spring elevates the spindle whenever the treadle is released. A locking-bar $F^2$ is provided with notches for locking treadle F in the desired position, whereby blade C enters the ground the desired depth. Spindle D is provided with a series of peripheral longitudinal grooves $d'$ (see Fig. 2) on the one side thereof.

G is a dog pivoted at G', the point of the dog operating in a slot of sleeve E, the point $g$ of the dog being adapted to enter groove $d'$ for locking the spindle as against turning on its axis. The dog is provided with a treadle $g'$ for backing the dog, and the treadle is provided with a spring $g^2$ for elevating the same and thereby causing the dog to engage the notches of the spindle. The operator has usually a foot resting on and depressing this treadle, and when he wishes to lock the spindle in any desired position he has only to release the treadle, having first turned the spindle to the desired position. For instance, the blade C may be turned by the side of the machine and elevated above the ground and locked in such position when not wanted, or the blade may be more or less extended and depressed to enter the ground, and may be locked in such position whenever there is no obstruction in the way for a short distance. It will be observed that groove $d'$ extends some distance up and down the spindle. Hence the spindle may be elevated or depressed while it is locked from turning. Blade C is constructed of a plate of tempered steel, the two edges thereof being alike except they are in reversed position, section $c$ of the one edge being curved laterally in the one direction, while section $c'$ of the same edge is curved laterally in the opposite direction. Blade C is secured to post C' by means of a single screw $c^2$, centrally located, and by loosening this screw the blade may be reversed whenever the one edge is worn out, and the post, to which the blade is secured, may be turned on its axis by loosening the nut thereof, so as to give blade C a broader cut. This blade is intended to enter the ground a short distance and to cut the grass and weeds under the surface of the ground, and is found very effective in such work. In cultivating between the rows with the main part of the cultivator blade C at the same time may be operated between vines, hills, or trees of a row, thereby saving much labor.

What I claim is—

1. A cultivator having a spindle, an arm connected therewith and adapted to swing laterally toward and from the cultivator, such arm bearing a cultivator-blade, and a hand-lever or suitable device on the spindle for turning the blade-bearing arm on its axis, substantially as set forth.

2. A cultivator having a lateral blade-bearing arm mounted on an upright spindle, the latter being journaled in a sleeve and having end-play through the sleeve, a spring for elevating the spindle, and a treadle for depressing the spindle, the parts being arranged substantially as set forth.

3. A cultivator having a laterally-swinging arm mounted on an upright spindle, the arm bearing a cultivator-blade, the spindle being journaled in the sleeve, and a hand-lever connected with the spindle for turning the latter on its axis, substantially as set forth.

4. A cultivator having a laterally-swinging arm bearing a cultivator-blade, such arm being mounted on an upright spindle having end-play, the spindle having a series of longitudinal grooves, a dog for engaging the respective grooves in locking the spindle, and a treadle for backing the dog, substantially as set forth.

5. A cultivator provided with a laterally-swinging arm bearing a reversible cultivator-blade, such blade being secured at the center thereof, each edge of the blade having sections curved laterally in opposite directions, substantially as set forth.

In testimony whereof I sign this specification, in the presence of two witnesses, this 24th day of March, 1891.

JACOB GEDEOHN.

Witnesses:
C. H. DORER,
WARD HOOVER.